United States Patent [19]

Plummer

[11] 4,264,167

[45] Apr. 28, 1981

[54] ADAPTER FOR COUPLING A CAMERA WITH A VIEWING DEVICE

[75] Inventor: William T. Plummer, Concord, Mass.

[73] Assignee: Polaroid Corporation, Cambridge, Mass.

[21] Appl. No.: 118,419

[22] Filed: Feb. 4, 1980

[51] Int. Cl.³ ............................................. G03B 29/00
[52] U.S. Cl. ....................................... 354/62; 354/79
[58] Field of Search ........................... 354/62, 79, 295; 350/19; 128/6

[56] References Cited

U.S. PATENT DOCUMENTS

| | | |
|---|---|---|
| 2,974,573 | 3/1961 | Faasch . |
| 3,089,398 | 5/1963 | Wilms . |
| 3,195,431 | 7/1965 | Augustin et al. . |
| 3,490,347 | 1/1970 | Seedhouse . |
| 3,638,643 | 2/1972 | Hotchkiss . |
| 3,900,021 | 8/1975 | Makepeace et al. ............ 128/4 |
| 3,911,451 | 10/1975 | Vockenhuber ............... 354/79 |
| 3,918,072 | 11/1975 | Imai et al. .................... 354/62 |
| 3,981,021 | 9/1976 | Beecher ........................ 354/79 |
| 3,994,288 | 11/1976 | Stumpf .......................... 128/6 |
| 3,995,287 | 11/1976 | Storz ............................ 354/62 |
| 4,157,216 | 6/1979 | Plummer ...................... 354/62 |

OTHER PUBLICATIONS

Stanford, B., "Principles of Endoscopic Photography", J. of Photo. Sc., vol. 3, 1955, pp. 1–4.

*Primary Examiner*—John Gonzales
*Attorney, Agent, or Firm*—Francis J. Caufield

[57] ABSTRACT

An adapter by which a self-contained camera having an objective lens can be optically and mechanically coupled with a well-known endoscope of the type having an especially designed eyepiece adapted to be changed between a viewing mode and a photographic mode, in which the eyepiece operates as an objective lens for forming an object image in a plane located a predetermined distance behind the eyepiece. The adapter of the invention is structured to mechanically and optically couple the self-contained camera to the endoscope and to change the endoscope eyepiece from its viewing mode to its photographic mode. Provided in the adapter is a negative lens which optically nullifies the objective lens function of the endoscope eyepiece of collimating convergent image forming rays therefrom so that the self-contained camera can be used to photograph the image formed by the endoscope with the camera objective lens focused at infinity.

4 Claims, 2 Drawing Figures

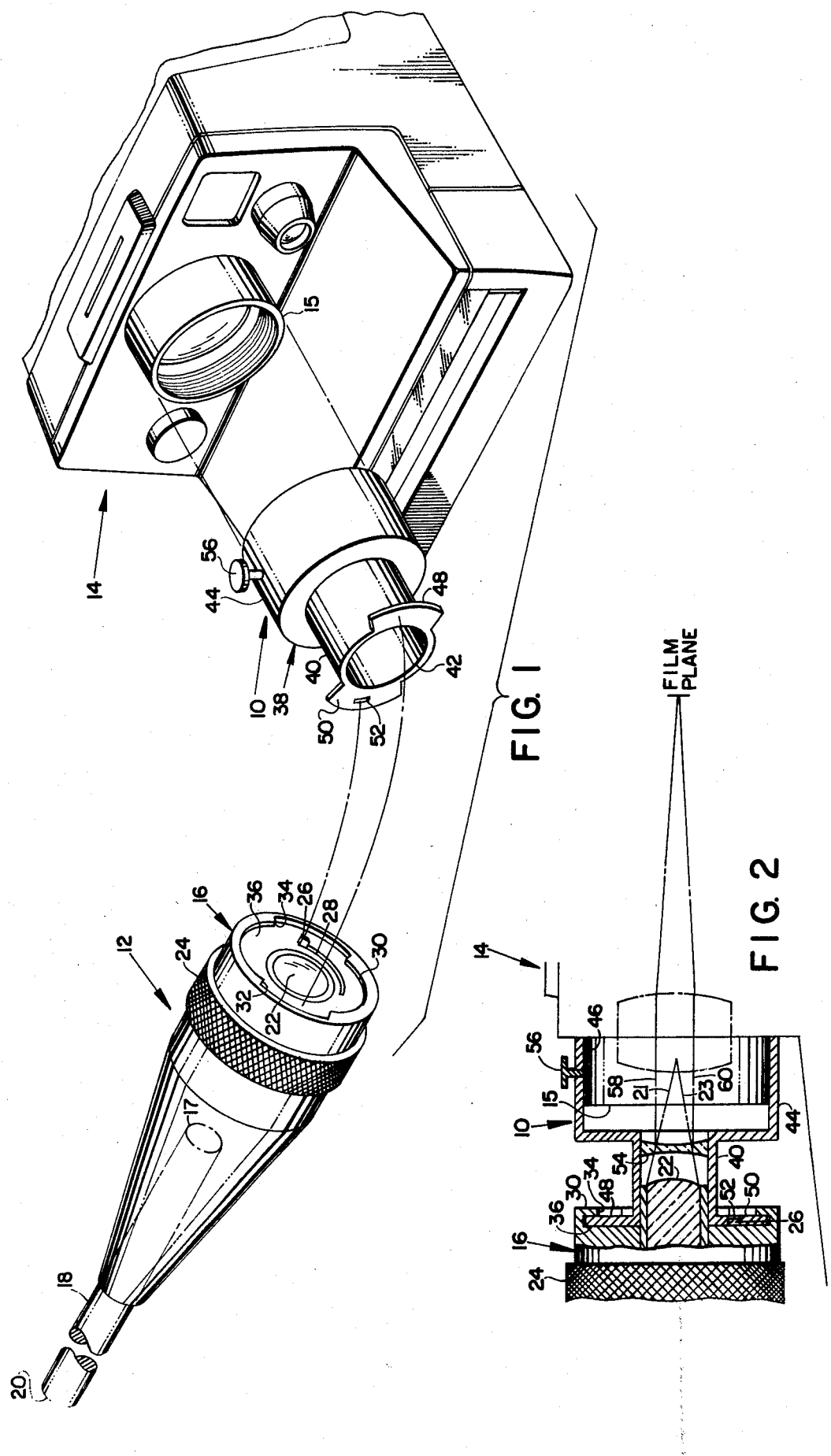

ADAPTER FOR COUPLING A CAMERA WITH A VIEWING DEVICE

BACKGROUND OF THE INVENTION

1. Field of the Invention

This invention generally relates to photographic apparatus and particularly to an adapter by which a self-contained camera can be coupled to an optical viewing device, such as an endoscope, so that an object image formed by an eyepiece of the viewing device can be photographed.

2. Description of the Prior Art

Endoscopes are optical viewing devices well-known for their ability to permit visualization of interior parts of the body which otherwise could not be observed because of their inaccessibility to the unaided eye. To accomplish this, endoscopes are generally provided with an objective lens, an optical relay system, and an eyepiece or occular. The objective lens operates to form a real image of an object under examination at some predetermined spatial location which is usually inside the body, and the relay system operates to transfer the real image along an elongated optical path to a convenient location outside of the body where it is then observed with the aid of the eyepiece.

The eyepiece is usually provided with an adjustment feature which permits people with different eye accommodation ability or vision to sharply focus on the real image. Observers with normal vision adjust the eyepiece so that image forming rays emerging from it are collimated, and observers with abnormal vision adjust the eyepiece so that image forming rays emerging from it converge or diverge slightly.

Photographing what the eye sees through such optical viewing devices is an established practice conducted with well-known photographic systems specially designed for endoscopic photography or with adapters by which existing self-contained cameras can be used with existing endoscopes. Examples of prior art systems and adapters for this purpose are shown and described in U.S. Pat. No. 3,638,643 issued to John E. Hotchkiss on Feb. 1, 1972 and entitled "Endoscope For Photographic Recording"; U.S. Pat. No. 3,918,072 issued to Toshihiro Imai et al. on Nov. 4, 1975 and entitled "Single-Lens Reflex Optical System For An Endoscope"; U.S. Pat. No. 3,995,287 issued to Karl Storz on Nov. 30, 1976 and entitled "Endoscopic Camera"; U.S. Pat. No. 3,900,021 issued to Anthony Peter Walter Makepeace et al. on Aug. 19, 1975 and entitled "Coupling For Endoscopes And Instruments Particularly Cameras"; U.S. Pat. No. 3,994,288 issued to Joseph G. Stumpf on Nov. 30, 1976 and entitled "Colposcope"; U.S. Pat. No. 3,490,347 issued to F. A. Seedhouse on Sept. 30, 1967 and entitled "Microscope Camera Adapter"; U.S. Pat. No. 4,157,216 issued to William T. Plummer on June 5, 1979 and entitled "Adapter For Optically Coupling A Photographic Camera With A Viewing Device"; and an article by Brian Stanford which appears in *The Journal of Photographic Science*, volume 3, 1955, and is entitled "Theoretical First Principles of Endoscopic Photography".

However, none of the foregoing publications deal directly with the specific problem with which the present invention is concerned. In particular, the primary object of the present invention is to provide an adapter by which a self-contained camera having an objective lens can be mechanically and optically coupled with an endoscope that is of the type especially adapted for photographic purposes to form an object image in a plane located a predetermined distance behind an eyepiece of the endoscope.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention in general relates to photographic apparatus and in particular to an adapter for optically and mechanically coupling a photographic camera to the proximal end of an optical viewing device such as an endoscope so that the camera can be focused at a predetermined object distance at which the image formed by the viewing device can be photographed. The viewing device is of the type which has an eyepiece arrangement that is adapted for changing between a viewing mode in which the eyepiece collimates or nearly collimates image forming rays from an object for direct observation by the eye and another mode in which the eyepiece converges image forming rays from the object to form a real image of the object in a plane that is located a predetermined distance behind the viewing device eyepiece.

The adapter of the invention comprises a housing for forming a generally light tight optical path having an entrance aperture for admitting light into the optical path and an exit aperture through which light can emerge from the optical path. The housing is structured to mechanically couple with the proximal end of the viewing device so that the housing entrance aperture is optically aligned with the viewing device eyepiece, to change the viewing device eyepiece arrangement from its viewing mode to its other mode upon mechanically coupling with the eyepiece, and to mechanically couple with the camera so that the housing exit aperture is optically aligned with the camera objective lens.

Additionally included in the adapter are optical means positioned along the housing optical path at a predetermined location intermediate the housing entrance and exit apertures for intercepting converging light rays from the image formed by the viewing device eyepiece when in its other mode and refracting such intercepted light rays so that the image formed by the refracted rays appears to originate from a predetermined object distance and can be photographed with the camera objective lens focused at the predetermined object distance.

In the preferred embodiment, the optical means comprise a negative lens of predetermined focal length structured to collimate rays intercepted thereby so that the camera can be focused at infinity for photographing.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 1 is a perspective view of the preferred embodiment of the invention shown in combination with a well-known endoscope and part of a camera; and FIG. 2 is a vertical section of the adapter and part of the endoscope of FIG. 1 when the two are coupled together and also shows, diagrammatically, the optical system of the camera of FIG. 1 with the camera objective lens coupled with the adapter of the invention.

DESCRIPTION OF THE PREFERRED EMBODIMENT

Referring now to FIG. 1, there is shown a photographic camera 14 having a variable focus lens 15, an optical viewing device in the form of a well-known endoscope 12, and an adapter 10 which is the preferred embodiment of the invention. The adapter 10, as will be seen, provides a means by which the endoscope 12 and the camera 14 can be optically and mechanically coupled to one another so that the camera 14 can photograph an image formed by the endoscope 12.

The endoscope 12 constitutes an optical viewing device comprising an elongated, flexible fiber optic bundle 18 which has an objective lens system (not shown) located at a distal end 20 thereof for forming a real image of an object or field being examined by an observer. The image formed at the distal end 20 is transferred in a well-known manner via the fiber optic bundle 18 to a proximal end 17 thereof which terminates in an eyepiece 16 of the endoscope 12.

The eyepiece 16 includes an optical system shown diagrammatically at 22 and a well-known arrangement by which the eyepiece 16 is adapted to change the optical system 22 between a viewing and a photographic mode of operation. In the viewing mode, which is illustrated in FIG. 1, the optical system 22 reimages the object image located at the fiber optic bundle proximal end 17 so that it can be directly viewed by an observer. The focus of the optical system 22 can be adjusted via a rotatable ring 24 until the image appears sharp to an observer. For the case of an observer with normal vision, the image formed by the optical system 22 will be collimated, i.e., light rays will emerge from the optical system 22 in parallel bundles, and therefore appear to originate at infinity. Otherwise, image forming rays from the optical system 22 will slightly converge or diverge depending on the vision and accommodation ability of the observer making the focus adjustment.

To change the eyepiece 16 from its viewing mode to its photographic mode of operation, a lever 26 is rotated clockwise (FIG. 1) in an arcuate slot 28. Movement of the lever 26 to the end of the arcuate slot 28 shifts the eyepiece optical system 22 along the optical axis in a well-known manner from its position shown in FIG. 1 to that shown in FIG. 2.

In the photographic mode of operation, the eyepiece optical system 22 refracts rays from the image formed at the fiber optical bundle proximal end 17 so as to focus or converge the rays on a plane which is located a predetermined distance behind the eyepiece 16 regardless of the focus adjustment made during the viewing mode.

The refracting action of the eyepiece optical system 22 in the photographic mode is shown in FIG. 2 wherein rays 21 and 23 represent the path that would be followed absent the adapter 10 by two axial rays originating at the center of the fiber optical bundle proximal end 17. Thus structured, the eyepiece 16 in its photographic mode operates as an objective lens to form a real image of an object in a conveniently located plane in which film can be placed to record the image thus formed. This could be done, for example, with a well-known 35 mm camera back having no objective lens and otherwise specifically designed for this purpose. However, as previously discussed, the primary object of this invention is to be able to photograph the image formed by the endoscope 12 with a self-contained camera 14 which has an objective lens (15) instead of with a specially designed camera back having no other utility.

The manner in which the adapter 10 enables the camera 14 to be used to photograph the image formed by the endoscope eyepiece 16 will best be understood by now referring to FIG. 1. It can be seen in FIG. 1 that the adapter 10 comprises a housing 38 which is constructed of a generally cylindrical front tubular section 40 that is integrally formed with a larger diameter cylindrical rear tubular section 44. The front tubular section 40 has a circular hole 42 which extends therethrough and is dimensioned to be slightly larger than the diameter of the eyepiece optical system 22. The rear tubular section 44 has extending therethrough a circular hole 46 (FIG. 2) that is dimensioned to receive therein the camera lens 15. Both tubular sections, 40 and 44, are preferably formed of an opaque material and are structured in the foregoing manner to provide a generally light-tight optical path along which image forming light rays from the eyepiece 16 can travel toward the camera objective lens 15 (FIG. 2).

Spaced 180 degrees apart around the circumference of the forward end of the front tubular section 40 and extending outwardly therefrom are a pair of ears 48 and 50. The ears 48 and 50 are shaped to fit through two complementary configured slots 32 and 34 which are cut out of a ring 30 that is located at the rear end of the eyepiece 16. The ear 50 includes a through slot 52 dimensioned to receive the lever 26. The ring 30 in combination with a flat surface 36 define an annular slot between them whose diameter is slightly larger than the diameter of the circumferential portions of the ears, 48 and 50, and whose width is slightly larger than the thickness of the ears, 48 and 50. With this arrangement, the ears, 48 and 50, insert through the eyepiece slots, 32 and 34, until their forward surfaces seat on the eyepiece surface 36. Rotation of the adapter 10 through 90 degrees (clockwise in FIG. 1) causes the ears 48 and 50 to be trapped behind the forward, non-cutout, portions of the ring 30 and automatically causes the lever 26 to be moved along the slot 28 to change the eyepiece 16 from its viewing to its photographic mode. In this manner, the adapter housing 38 is structured to mechanically couple in bayonet fashion with the proximal end of the eyepiece 16 so that the aperture 42 is optically aligned with the eyepiece optical system 22.

The camera lens 15 slides into the aperture 46 of the rear tubular section 44 and is held in place by a thumbscrew 56 (FIG. 2).

Positioned at a predetermined location along the optical path of the adapter 10 is a negative lens 54 (FIG. 2) which intercepts converging light rays from the eyepiece optical system 22. The negative lens 54 is optically structured in a well-known manner to preferably refract the light rays intercepted thereby so that the refracted rays emerge therefrom parallel to one another as illustrated, for example, by the rays 58 and 60 in FIG. 2. The parallel bundles of rays emerging from the lens 54 enter the camera objective lens 15 which, when focused at infinity, converges the parallel bundles to a focus at the camera film plane as shown in FIG. 2. In this manner, the adapter 10 provides a means by which the camera objective lens 15 can be set at a predetermined focus setting to photograph the image formed by the eyepiece 16.

The focal length and spacing of the negative lens 54 is preferably selected in a well-known manner so that the image formed on the camera film plane is magnified compared to what its size would otherwise be absent the adapter 10.

The primary advantage of the adapter 10 is that it provides a simple means by which the camera 14 can be easily coupled with the eyepiece 16 to obtain sharp images without the need of a focusing aid to adjust the eyepiece 16 for photographic purposes. This is possible because the eyepiece optical system 22 is always placed in the same location and has the same back focal length every time the eyepiece 16 is changed to its photographic mode.

Certain changes may be made in the above-described embodiment without departing from the scope of the invention and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. An adapter for optically and mechanically coupling a photographic camera to the proximal end of an optical viewing device such as an endoscope so that the camera can be focused at a predetermined object distance at which the image formed by the viewing device can be photographed wherein the viewing device is of the type which has an eyepiece arrangement that is adapted for changing between a viewing mode in which the eyepiece collimates or nearly collimates image forming rays from an object for direct observation by the eye and another mode in which the eyepiece converges image forming rays from the object to form a real image of the object in a plane that is located a predetermined distance behind the viewing device eyepiece, said adapter comprising:

a housing for forming a generally light tight optical path having an entrance aperture for admitting light into said optical path and an exit aperture through which light can emerge from said optical path, said housing being structured to mechanically couple with the proximal end of the viewing device so that said entrance aperture is optically aligned with the viewing device eyepiece, to change the viewing device eyepiece arrangement from its viewing mode to its other mode upon said mechanical coupling, and to mechanically couple with the camera so that said exit aperture is optically aligned with the camera objective lens; and optical means positioned along said housing optical path at a predetermined location intermediate said entrance and exit apertures for intercepting converging light rays from the image formed by the viewing device eyepiece when in its other mode and refracting such intercepted light rays so that the image formed by said refracted rays appears to originate from a predetermined object distance and can be photographed with the camera objective lens focused at said predetermined object distance.

2. The adapter of claim 1 wherein said optical means are structured to collimate rays intercepted thereby so that the camera can be focused at infinity for photographing.

3. The adapter of claim 1 wherein said optical means are further structured and arranged with respect to the viewing device eyepiece to cooperate therewith to provide a collimated, magnified image when the viewing device eyepiece is in its other mode.

4. The adapter of claim 2 or 3 wherein said optical means comprise a negative lens of predetermined focal length.

* * * * *